United States Patent
Venkataramani et al.

(10) Patent No.: US 6,361,735 B1
(45) Date of Patent: Mar. 26, 2002

(54) COMPOSITE CERAMIC ARTICLE AND METHOD OF MAKING

(75) Inventors: Venkat Subramaniam Venkataramani, Clifton Park; Charles David Greskovich, Schenectady; Steven Jude Duclos, Clifton Park; James Anthony Brewer, Glenville, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/388,091

(22) Filed: Sep. 1, 1999

(51) Int. Cl.[7] .............................................. C04B 35/64
(52) U.S. Cl. ...................... 264/643; 264/642; 264/645; 264/656; 264/614; 156/89.11; 156/89.23
(58) Field of Search .................. 264/614, 642, 264/643, 645, 656; 156/89.11, 89.23

(56) References Cited

U.S. PATENT DOCUMENTS

| | | |
|---|---|---|
| 4,362,946 A | 12/1982 | Cusano et al. |
| 4,533,489 A | 8/1985 | Utts et al. |
| 4,720,426 A | 1/1988 | Englert et al. |
| 4,870,279 A | 9/1989 | Cueman et al. |
| 5,013,696 A | 5/1991 | Greskovich et al. |
| 5,100,598 A | 3/1992 | Dole et al. |
| 5,116,559 A | 5/1992 | Dole et al. |
| 5,116,560 A | 5/1992 | Dole et al. |
| 5,239,736 A | 8/1993 | Sliwa, Jr. et al. |
| 5,296,163 A | 3/1994 | Leppert et al. |
| 5,338,598 A * | 8/1994 | Ketcham .................. 428/210 |
| 5,340,510 A * | 8/1994 | Bowen ...................... 264/645 |
| 5,453,623 A | 9/1995 | Wong et al. |
| 5,484,750 A | 1/1996 | Greskovich et al. |
| 5,497,540 A | 3/1996 | Venkataramani et al. |
| 5,506,409 A | 4/1996 | Yoshida et al. |
| 5,521,387 A | 5/1996 | Riedner et al. |
| 5,547,530 A * | 8/1996 | Nakamura ................. 264/614 |
| 6,004,500 A * | 12/1999 | Safari et al. ............... 264/642 |
| 6,113,836 A * | 9/2000 | Sakai et al. ............... 264/642 |

FOREIGN PATENT DOCUMENTS

| | | | |
|---|---|---|---|
| DE | 19643148 | 10/1996 | |
| DE | 19709690 | 3/1997 | |
| DE | 19709691 | 3/1997 | |
| JP | 61-290007 | * 12/1986 | ................. 264/642 |

OTHER PUBLICATIONS

V.F. Janas et al., Overview of Fine–Scale Piezoelectric Ceramic/Polymer Composite Processing, J. Am. Ceram. Soc., 78[11]2945–55(1995).

* cited by examiner

Primary Examiner—James Derrington
(74) Attorney, Agent, or Firm—Toan P. Vo; Noreen C. Johnson

(57) ABSTRACT

The invention relates to a method of forming a composite article comprising the steps of forming a plurality of green ceramic elements, wherein the green ceramic elements are arranged side by side, and the green ceramic elements are spaced from each other by gaps; filling the gaps with a second material; and sintering the green ceramic elements with the second material to form the composite article. The second material, after being sintered, acts as a reflector layer to prevent substantially all light in one of the sintered ceramic elements from reaching an adjacent sintered ceramic element. The step of filling the gaps may be carried out by forming a slurry containing the second material in powder form and immersing the green ceramic elements in the slurry. The process of cosintering the green ceramic elements with the reflector composition provides improved dimensional control during sintering and reduces processing costs.

28 Claims, 4 Drawing Sheets

COMPOSITE CERAMIC ARTICLE AND METHOD OF MAKING

BACKGROUND

1. Field of the Invention

This invention relates generally to ceramics and more particularly to a composite article comprising a luminescent ceramic material and an interspersed reflective material formed by cosintering a first ceramic material and a second material.

2. Description of the Related Art

A luminescent material absorbs energy in one portion of the electromagnetic spectrum and emits energy in another portion of the electromagnetic spectrum. Most luminescent materials, also known as "phosphors" or "scintillators", emit radiation in the visible portion of the spectrum in response to the absorption of radiation outside the visible portion of the spectrum. Most phosphors are responsive to portions of the electromagnetic spectrum which are more energetic than the visible portion of the spectrum. For example, there are phosphors which are responsive to ultraviolet light (as in fluorescent lamps), electrons (as in cathode ray tubes) and x-rays (as in radiography).

One example of an application using luminescent materials is a computed tomography (CT) scanner. In a CT scanner, an x-ray source and an x-ray detector array are positioned on opposite sides of a subject and rotated around the subject in fixed relation to each other. CT scanners typically include a solid scintillator which comprises a luminescent material in the form of a transparent solid body. A typical detector array in a CT scanner includes a plurality of individual scintillator bars positioned side-by-side with an individual photodetector diode coupled to each scintillator bar to convert its luminescent light into a corresponding electrical signal. The scintillator material of a cell absorbs x-rays incident on that cell and emits light which is collected by a photodetector for that cell. During data collection, each cell of the detector array provides an output signal representative of the present light intensity in that cell of the array. The luminescent material in a CT scanner typically has a linear characteristic in which the light output is a linear function of the amount of absorbed radiation such that the light output can be directly correlated with the intensity of stimulating radiation. The output signals are processed to create an image of the subject in a manner which is well known in the CT scanner art.

It is generally advantageous to provide a reflective coating on the surfaces of the scintillator bar other than the surface on which the photodetector diode is located. The coating reflects the light produced in the individual scintillator bars of the array. The reflective properties of the coating improve the accuracy of the resulting image by preventing light from propagating from one scintillator bar to another (commonly referred to as "cross talk").

Various methods are known in the art for forming a detector array comprising a number of scintillator bars separated by reflective layers. Typically, the scintillator material is produced by preparing an appropriate ceramic powder, milling the powder, and pressing the powder to form a wafer. The wafer is then sintered, typically to a density greater than 99% of theoretical density.

One problem which is known to occur with conventional scintillator forming methods is that during the sintering step, the wafer may warp. The warping is due to differential shrinkage caused by an inhomogeneous density distribution in the scintillator material. Because the dimensional tolerances for scintillator bars in some applications are very small, e.g. less than 0.0013 cm (0.0005 inch), differential shrinkage during sintering of the scintillator bars can make the final dimensions of the bars very difficult to achieve without further processing. Thus, the scintillator wafer is typically ground, lapped, and polished to the desired dimensions after sintering, which can be costly and time consuming. The process of providing a reflective coating on surfaces of the scintillator bars may also be costly, as it can involve many process steps.

Other methods of forming detector arrays are known. For example, German Patent No. 19709690 A1 discloses a ceramic element with a layer structure containing alternating layers of high density and high porosity. The porous layers include microstructures which form bridges between the adjacent layers of high density. This method, however, results in a detector array in which the scintillator elements are optically coupled by the bridges, which produces cross talk, decreasing the imaging accuracy of the device.

German Patent No. 19709691 A1 discloses a process for the manufacture of a structured ceramic element in which green ceramic elements provided with spacer structures are stacked and sintered. A function assisting material can be added to the cavities between the spacer structures after the green ceramic elements are sintered. However, again, the spacer elements optically couple the ceramic elements, which decreases the imaging accuracy of the device.

It would be desirable, therefore, to have a method of easily and effectively forming a detector array including a reflective layer interspersed between scintillator bars, while avoiding problems found in known methods.

SUMMARY

A method of forming a composite article, according to an exemplary embodiment of the invention, comprises the steps of forming a plurality of green ceramic elements, wherein the green ceramic elements are arranged side by side, and the green ceramic elements are spaced from each other by gaps; filling the gaps with a second material; and sintering the green ceramic elements with the second material to form the composite article. The second material, after being sintered, acts as a reflector layer to prevent substantially all light in one of the sintered ceramic elements from reaching an adjacent sintered ceramic element. The plurality of green ceramic elements may be formed by injection molding and may each extend from a common connecting member.

The step of filling the gaps may be carried out by forming a slurry containing the second material in powder form and immersing the green ceramic elements in the slurry. The step of filling the gaps may also be carried out by spraying the second material in powder form into the gaps. The second material which fills the gaps can be the same material as that used to form the green ceramic elements, but having a different pack density and/or particle size, for example.

The process of cosintering the green ceramic elements with the reflector composition provides improved dimensional control during sintering and reduces processing costs.

BRIEF DESCRIPTION OF THE DRAWINGS

Other features and advantages of the invention will be apparent from the following detailed description and the accompanying drawings, in which.

DETAILED DESCRIPTION OF THE PREFERRED EMBODIMENTS

Figure 1:
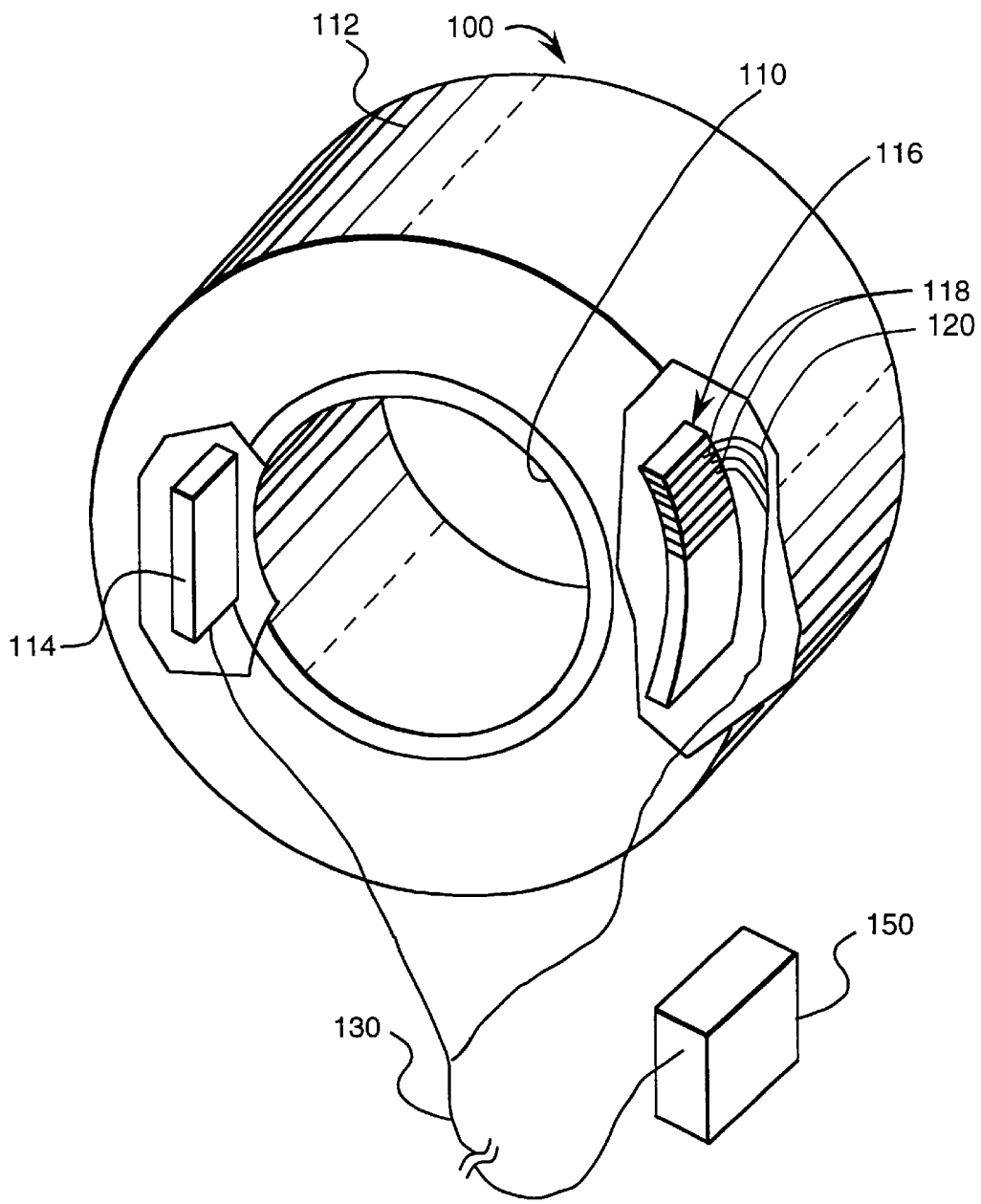
FIG. 1 is a drawing of a computed tomography scanning system according to an exemplary embodiment of the invention.

FIG. 1 is an illustration of an example of a computed tomography (CT) scanning system. The CT scanning system 100 comprises a cylindrical enclosure 110 in which the patient or object to be scanned is positioned. A gantry 112 surrounds the cylinder 110 and is configured for rotation about the cylinder's axis. The gantry 112 may be designed to revolve for one full revolution and then return or may be designed for continuous rotation, depending on the system used, to connect the electronics on the gantry to the rest of the system. The electronics on the gantry include an x-ray source 114 which typically produces a fan x-ray beam which is incident on a scintillator detector array 116 mounted on the gantry on the opposite side of the cylinder 110. The fan pattern of the x-ray source is disposed in the plane defined by the x-ray source and the detector array 116.

Each cell 118 of the scintillator detector array 116 incorporates a solid transparent bar of scintillator material and a photodetector diode optically coupled to that scintillator bar. The output from each photodetector diode is connected to an operational amplifier which is mounted on the gantry. The output from each operational amplifier is connected either by individual wires 120 or by other electronics to the main control system 150 for the computed tomography system. In the illustrated embodiment, power for the x-ray source and signals from the scintillation detector array are carried to the main control system 150 by a cable 130. Alternatively, slip rings or optical or radio transmission may be used to connect the gantry electronics to the main control system 150 where continuous rotation of the gantry is desired. In CT scanning systems of this type, the scintillator material is used to convert incident x-rays to luminescent light which is detected by the photodetector diode and thereby converted to an electrical signal which may be processed for image extraction and other purposes.

The scintillator bars in the detector array 116 are typically spaced closely together with one face, the front face, receiving the radiation. Light emitted within a scintillator bar is transmitted for detection to the rear face, opposite the front face. Emission of light may take place anywhere within the irradiated volume and may propagate in any direction. Consequently, there is a relatively high probability that emitted light travels toward a face other than the rear face. Accordingly, each scintillator bar typically includes a reflective coating on its outer surfaces to redirect light into the scintillator bar and toward the photodetector at the rear face. The reflective coating prevents light in one of the scintillator bars from reaching an adjacent scintillator bar.

The detector array 116, according to one embodiment of the invention, is prepared by forming a plurality of green ceramic elements, wherein the green ceramic elements are arranged side by side and are spaced from each other by gaps. The gaps are then filled with the reflecting material, and the composite article (comprising the green ceramic elements and interspersed reflecting material) is sintered. The term "green ceramic" refers to a ceramic material which may or may not include a binder. The green ceramic material has a density less than theoretical density, typically less than 65% of theoretical density, and typically has an open pore structure. The term "green ceramic" includes what is conventionally known as bisque fired ceramic material, e.g. a material obtained by presintering a ceramic compact to remove the binder and increase its mechanical stability through necking of the particles in the compact. The green ceramic material, therefore, may have a density up to about 90% of theoretical density.

Figure 2:
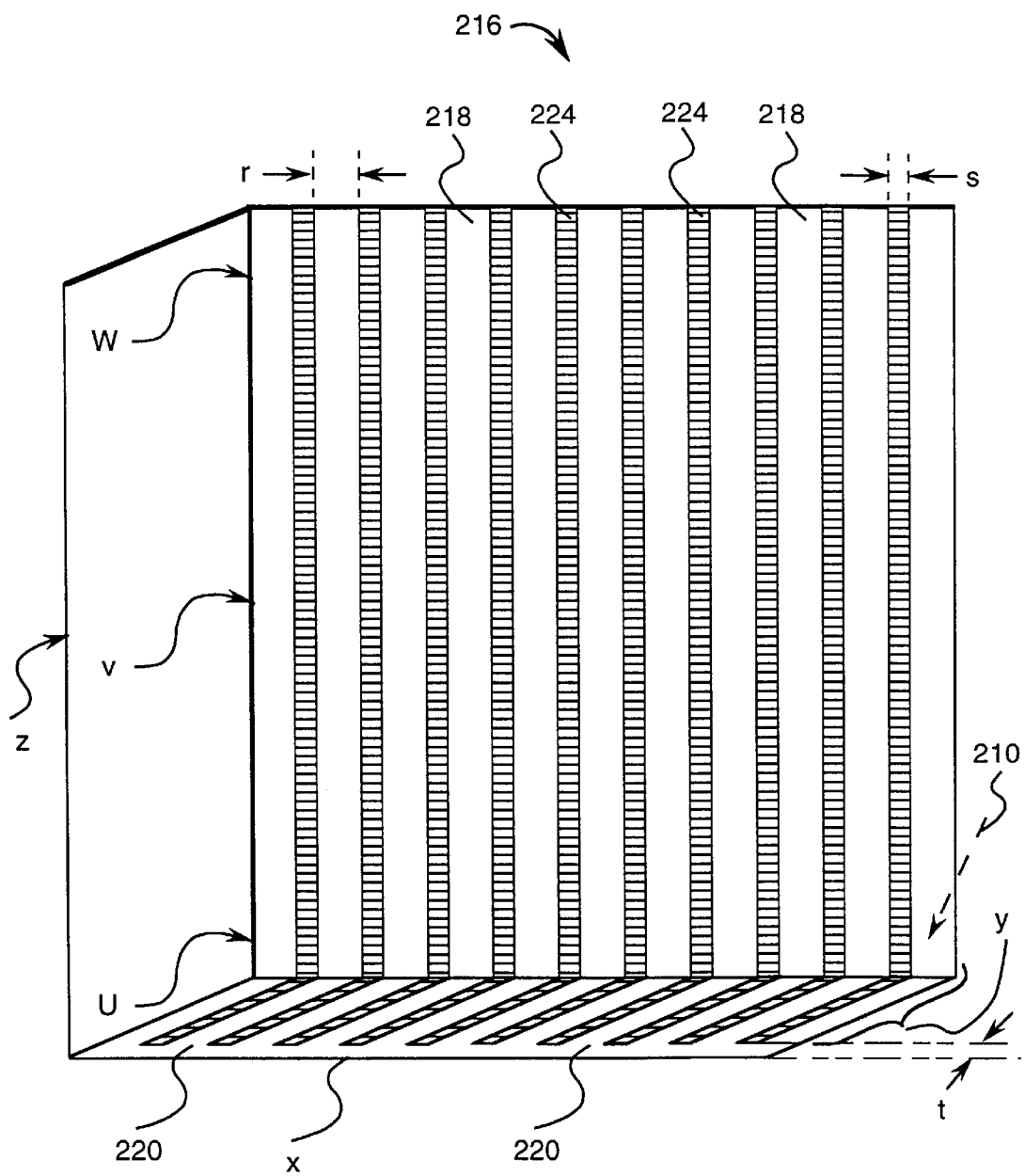
FIG. 2 is a drawing of a composite article comprising a plurality of green ceramic elements and a reflector material interspersed between the elements according to an exemplary embodiment of the invention.

The green ceramic elements, according to one embodiment of the invention, are formed by preparing a suitable ceramic powder, dispersing the ceramic powder in a binder, and injection molding the composition in the shape of an array of green ceramic elements. FIG. 2 shows an example of a composite article formed by injection molding. The composite article 216 includes a number of green ceramic elements 218 which each extend from a connecting member 220. The connecting member 220, as illustrated in FIG. 2, is rectangular in shape, and extends along sides "x" and "z" of the composite article 216. The connecting member 220 has a thickness "t". The connecting member 220 is integrally connected to the green ceramic elements 218.

The luminescent material has a thickness "y" in the direction of x-ray travel (shown by arrow 210). The thickness "y" after sintering is typically about 2–4 mm, while the sides x and z typically each have a length of about 20–40 mm. The gaps between the ceramic elements after sintering are typically about 100–130 microns wide. These dimensions are of course merely examples.

As shown in FIG. 2, each element in the scintillator array is separated by a reflective layer 224. The reflective layers 224 reflect the light produced in the individual elements 218 of the array. Preferably, the reflective layer is a diffuse reflector as opposed to a specular reflector. In a specular reflector, light impinging on any of the mirrored faces is reflected back into the bar. Eventually, some of the reflected light reaches the rear face and be detected. Several types of loss occur in this process making the light output less than is desired. For example, light striking a specularly reflecting surface at close to normal incidence may require many reflections before it reaches the rear face. A good reflector, e.g. silver, reflects only about 95 percent of the incident light and absorbs the rest. Thus, about five percent of the light is lost on each reflection. After many reflections from the surfaces of the scintillator bar, very little of the light is left. Furthermore, light is absorbed by the scintillator material in each transit through the bar between reflections from the surfaces. By contrast, these problems are avoided to a significant extent with a diffuse reflector which acts as scatterer of light rather than a reflector. Light impinging on a diffuse reflector at normal incidence, for example, is emitted with a generally cosine distribution. Thus, a much greater proportion of the impinging energy is directed back into the bar at shallow angles effective for reaching the rear face with less interaction with the other faces.

Figure 4:
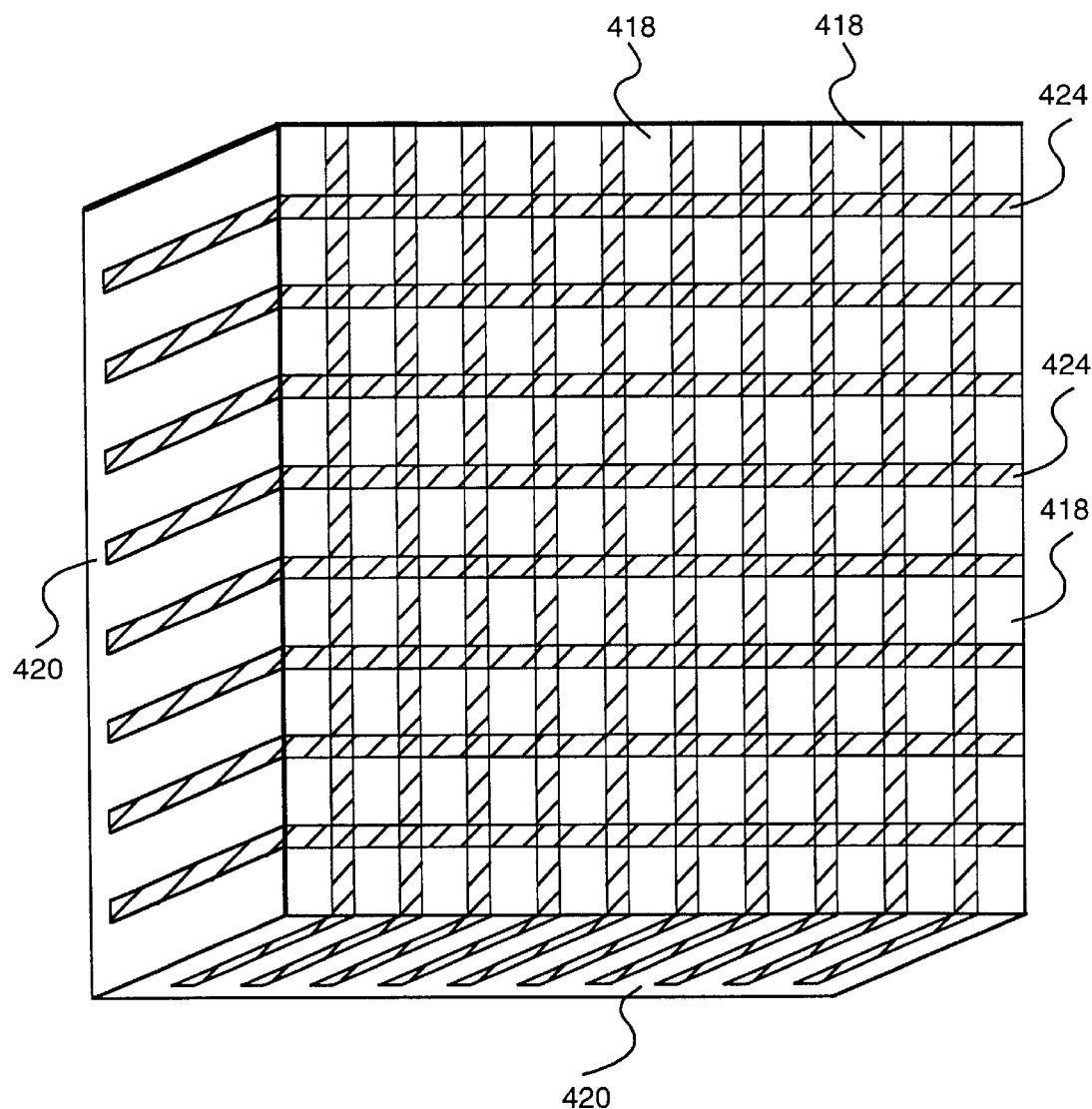
FIG. 4 is a drawing of a composite article comprising a plurality of green ceramic elements and a reflector material interspersed between the elements according to another embodiment of the invention.

FIG. 4 illustrates another embodiment of the invention in which the green ceramic elements take the form of a grid or pixel structure. The gaps 424 filled with the reflector material run in two perpendicular directions. The green ceramic elements 418 extend from a connecting member 420.

One example of a ceramic powder which can be used to make the array of green ceramic elements comprises $Gd_2O_3$, $Y_2O_3$, and at least one rare earth activator oxide. According to this embodiment, the scintillator bars have a composition consisting essentially of between about 5 and 50 mole percent $Gd_2O_3$, between about 0.02 and 12 mole percent of a rare earth activator oxide selected from the group consisting of $Eu_2O_3$ and $Nd_2O_3$, and between about 0.003 and 0.5 mole percent of at least one afterglow reducer selected from the group consisting of $Pr_2O_3$ and $Tb_2O_3$. The remainder of the scintillator composition is $Y_2O_3$.

The ceramic powder according to this embodiment, can be prepared by mixing submicron-to-micron powders of yttria and gadolinia having purities of, for example, 99.99 percent to 99.9999 percent with the desired rare earth activators in the form of oxides, oxalates, carbonates, or nitrates, and mixtures thereof. The selected constituents may be mixed in an agate mortar and pestle or in a ball mill using water, heptane, or alcohol as liquid vehicles, for example. Dry milling may also be used for mixing and for breaking up powder aggregates, and preferably includes employing a grinding aid such as 1 to 5 percent of stearic acid or oleic acid to prevent powder packing or sticking inside the ball mill. If any of the chemical constituents are added in the form of nitrates, carbonates, or oxalates, a calcining step is typically required to obtain the corresponding oxides prior to fabrication of the ceramic scintillator.

One exemplary method of making the aforementioned scintillator materials involves dissolving the oxide compounds of gadolinia, europia and yttria in nitric acid to form a nitrate solution. For compositions containing praseodymium oxide, $Pr_6O_{11}$ is also dissolved in nitric acid. These two nitrate solutions are then mixed and added to a supersaturated solution of oxalic acid to produce a co-precipitated crystalline oxalate powder. The oxalate powder is washed and dried, and then calcined by heating it in air at about 800° C. to form the desired oxide powder.

For compositions containing terbium oxide, $Tb_4O_7$ is dissolved in nitric acid in lieu of or in addition to $Pr_6O_{11}$ to produce a nitrate solution which is mixed with the nitrate solution of gadolinia, europia, and yttria. It should be understood that $Pr_6O_{11}$ and $Tb_4O_7$ are converted to dissolved $Pr_2O_3$ and $Tb_2O_3$, respectively, in the scintillator composition upon heat treatment of the scintillator material during such preparation methods as sintering. Neodymium can be used as the activator in lieu of or in addition to europium. In this case, $Nd_2O_3$ is added to the nitrate solution.

A desirable concentration of $Eu_2O_3$ is between about 1 and 6 mole percent. $Nd_2O_3$ is preferably added in concentrations of between about 0.05 and 1.5 mole percent. The concentration of $Gd_2O_3$ may generally range between about 5 mole percent and 50 mole percent. Additional details of this method of formation are described in U.S. Pat. No. 5,521,387, which is hereby incorporated by reference.

According to another embodiment of the invention, the scintillator composition comprises a host garnet material activated for x-ray or photoluminescence with appropriate ions which may include, for example, chromium, cerium, neodymium, and other cations or mixtures thereof. The host garnets for these materials may be three-element (two-cation) garnets such as gadolinium gallium garnet ($Gd_3Ga_5O_{12}$) or yttrium aluminum garnet ($Y_3Al_5O_{12}$), for example, or may comprise more than three elements such as gadolinium scandium gallium garnet ($Gd_3Sc_2Ga_3O_{12}$) or gadolinium scandium aluminum garnet ($Gd_3Sc_2Al_3O_{12}$), for example.

The scintillator starting powder for such a composition can be made by forming a hydrochloric acid solution of the desired cations in appropriate quantities. By appropriate quantities is meant relative concentrations which result in the final transparent body containing the desired relative proportions of cations. Thus, in those situations where cations are present in the same relative concentrations in the final transparent body as they are in the hydrochloric acid solution of the source cations, it is that relative concentration which is desired in the hydrochloric acid solution. In those situations where the quantity of one or more cations decreases relative to the quantity of other cations during the process of converting the source hydrochloric acid solution into the final transparent polycrystalline body, then appropriate quantities in the hydrochloric acid starting solution are those quantities which result in the final transparent garnet body having the desired composition.

One way of forming this source chloride solution is by dissolving the source cations in the form of oxides in hot concentrated hydrochloric acid. The source cations may be provided as chlorides rather than oxides, if desired. Other source compounds may also be used. Once the source materials have completely dissolved in the hot concentrated hydrochloric acid, the resulting solution is cooled to room temperature. The resulting solution should be clear and free of precipitates or settling out of any of the source material. In the event that precipitation or settling out of source material occurs, the solution should be reheated, and additional hydrochloric acid added to the solution so that upon cooling to room temperature again, no precipitation or settling out occurs. That is, enough hydrochloric acid should be used to ensure that the source materials are not present at or above their solubility limit at room temperature.

Separately, an ammonium oxalate $(NH_4)_2C_2O_4$ solution is formed by dissolving ammonium oxalate or individual amounts of ammonia and oxalic acid. Enough ammonium oxalate should be prepared to ensure complete reaction with the cation-containing chloride solution. This ammonium oxalate solution typically has a pH between about 7.5 and about 9.5, more typically between 8.0 and 8.5.

When making small batches, the chloride cation source solution can be dripped into the ammonium oxalate solution while the ammonium oxalate solution is being stirred. A white precipitate typically forms upon contact between the two solutions. The inclusion of a magnetic stirring rod in the mixing container is a preferred method of mixing these solutions where small quantities are being prepared. Once all of the chloride source solution has been added to the ammonium oxalate solution, the precipitate formation is complete.

During the precipitation step, the precipitate forms in small enough particles that initially, a colloidal suspension of the precipitate in the oxalate solution is present. Following the completion of the precipitation step, this colloidal suspension will slowly settle out to leave a white precipitate at the bottom of the container and a clear solution above it. This settling process can be accelerated by filtering and/or centrifuging the precipitate-containing liquid.

If desired, the precipitate may be water and/or alcohol washed before separating the precipitate from the liquid. This is done by allowing the precipitate to settle, pouring off or otherwise removing most of the liquid and adding the wash water or alcohol, allowing the precipitate to settle again, and again removing the clear liquid. Where high purity and/or closely controlled composition of the final transparent garnet is desired, the wash water should be high purity deionized water, and the alcohol should be of standard reagent grade purity. This washing process removes excess ammonium oxalate and reaction products such as ammonium chloride from the precipitate. The precipitate is then separated from the wash solution by filtering, centrifuging or other appropriate techniques. This precipitate is preferably dried, such as by oven drying at a temperature of approximately 110° C. for a day or by vacuum drying. The dried precipitate is then heated in air to a temperature of about 750° C. to thermally decompose it.

This powder is typically milled in a ball mill, for example, using zirconia grinding media and a liquid vehicle such as methyl or isopropyl alcohol. Ball milling times from about 4 to 24 hours are effective. Alternatively, fluid energy milling or jet milling may be used with pressure settings of from about 60 to about 100 psi.

The particle size distribution of the milled powder typically ranges from about 0.1 to 2 microns. Powder compacts pressed from this milled powder can be sintered to full theoretical density. Other details of the process of making a ceramic powder suitable for an activated garnet based scintillator are disclosed in U.S. Pat. No. 5,484,750, which is hereby incorporated by reference.

After the desired ceramic powder is prepared, an array of green ceramic elements can be formed from the ceramic powder. According to one embodiment, the ceramic powder is dispersed in a suitable binder, and the array of green ceramic elements is integrally formed in one piece to near net shape by injection molding. The integrally formed array provides advantages in terms of manufacturing. For example, the reflective coating can be easily applied to each ceramic element by filling the gaps between elements with an appropriate reflective material. Furthermore, the process of cosintering the reflective material and the ceramic elements provides improved dimensional control of the ceramic elements during sintering, which can reduce or even eliminate the need for some of the conventional subsequent processing steps.

In the injection molding process, the ceramic powder is blended with a suitable binder. This blending step may be carried out with a high intensity mixer, for example. One example of a suitable binder comprises:

33⅓ parts by weight paraffin wax, melting point 52–58° C.;

33⅓ parts by weight paraffin wax, melting point 59–63° C.;

33⅓ parts by weight paraffin wax, melting point 73–80° C.;

The above paraffin waxes are available from Aldrich Chemical under product numbers 317659, 327212, and 411671, respectively. The following substances are added to the 100 parts by weight paraffin wax: 4 parts by weight white beeswax, 8 parts by weight oleic acid, and 3 parts by weight aluminum stearate.

The binder may alternatively comprise, for example, a combination of a low melting point wax such as beeswax, a higher melting point polymer such as polypropylene or polyethylene-ethyl vinyl acetate copolymer, and a lubricant such as stearic acid. Other suitable binders for injection molding the ceramic powder are commercially available, for example from Allied Signal Inc. in Torrance, Calif. and Benchmark Ceramics in Buffalo, N.Y.

Figure 3:
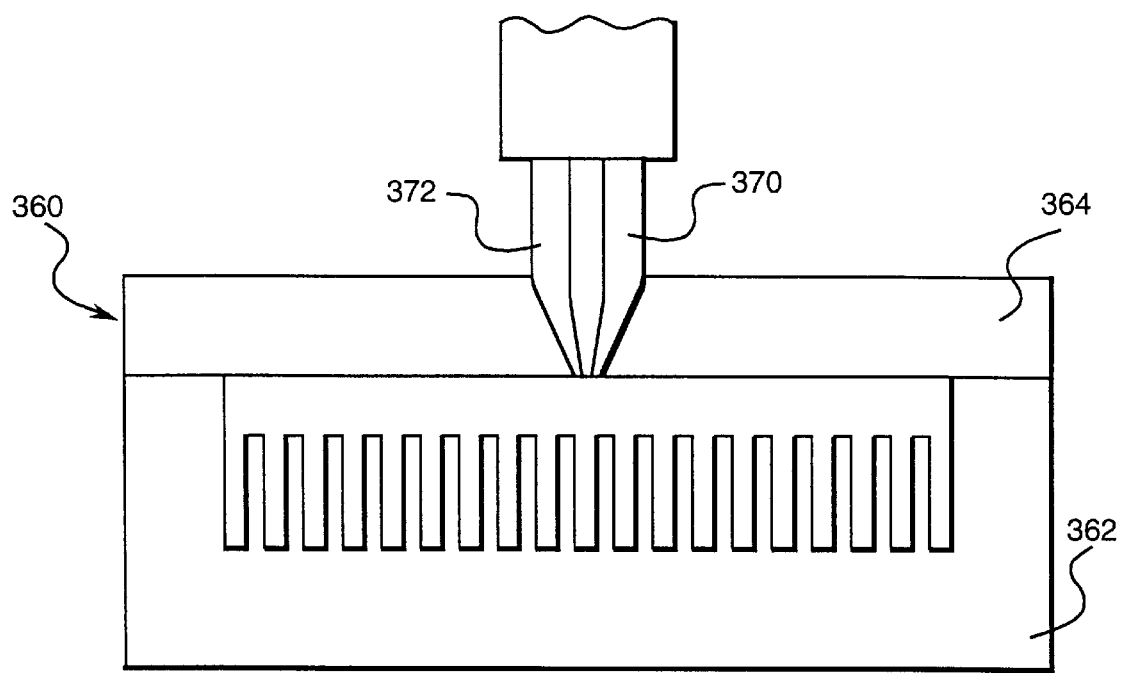
FIG. 3 is a drawing of an exemplary apparatus for injection molding an array of green ceramic elements.

An exemplary apparatus for manufacturing an array of green ceramic elements by injection molding is shown in FIG. 3. In FIG. 3, a mold 360 is shown along with an injector 370 containing the scintillator material. In the injection molding process, the molding composition, e.g. ceramic powder dispersed in organic binder, is heated to its softening point and injected with the injector 370 into the mold 360 to form the desired shape. The mold 360 may include a body portion 362 and a cover portion 364.

In the injection molding process, the injector 370 fills the mold with the scintillator material through passage 372. The scintillator material cools and hardens in the mold after injection. The injector and the cover portion 364 of the mold are withdrawn after the scintillator material has hardened. The molded article, in this case an array of green ceramic elements, is then released from the mold. The density of the green ceramic elements after injection molding is typically between 45% and 65% of the theoretical density.

Other methods of forming the array of green ceramic elements to near net shape according to exemplary embodiments of the invention include slip casting and gel casting. The array of green ceramic elements can also be formed by machining slots into a block of green ceramic material with a diamond saw, for example. The block of green ceramic material can be formed by conventional methods such as isostatic pressing, extruding, or injection molding.

The gaps between the individual green ceramic elements are then filled with the reflective material, as shown in FIG. 2 or 4. According to one embodiment, the reflective material is supplied in the form of a liquid slurry comprising a reflective powder dispersed in a suitable liquid. The array of green ceramic elements is immersed into the slurry. This can be accomplished, for example, by positioning the array of green ceramic elements inside of a suitably sized container. The container typically will have side walls higher than the height of the array of green ceramic elements such that the array can be completely submerged in the slurry. The slurry is cast into the gaps and over the top of the array. For enhanced penetration, the reflective slurry can be vacuum impregnated into the gaps if desired.

The reflective powder may comprise, for example, refractory oxides such as yttrium oxide, zirconium oxide, hafnium oxide, tantalum oxide, oxides of the lanthanides, oxides of the actinides, titanates such as barium titanate, high melting point aluminates, silicates of heavy metal oxides, and compounds thereof. One example of a suitable reflective powder is yttrium oxide or a mixture of yttrium oxide and carbon, a pore former. The reflective powder typically has a high index or refraction, e.g. greater than about 1.80, and a mean particle diameter between ⅓ and ⅔ of the wavelength of the light to be reflected. Typically in scintillator applications, the wavelength of light generated by the scintillator bar may range from 400–700 nanometers. The reflective powder typically has a high melting point, for example greater than or equal to the melting point of the scintillator material so that the reflector material does not fuse or react excessively with the scintillator material.

The reflective powder can be dispersed into a suitable liquid such as water or organic solvents such as alcohols or olefins. Additional organic binders such as poly alcohols, acrylates, acryloids, and acrylamides can be incorporated to provide strength to the dried slurry. The dispersion of the powder can be enhanced with the use of suitable dispersing and wetting agents such as poly electrolytes, as is well known in the art.

After applying the slurry to the array of green ceramic elements, the slurry is dried or air-cured to form a composite article comprising the solidified reflector material and the array of green ceramic elements. The reflector slurry may also be cured, for example, by heating at about 80–90° C. for about 7–9 hours to polymerize the binder in the reflector composition. The slurry can be oxidized, if necessary, to burn out carbon, if present.

According to other embodiments of the invention, the reflector material can be applied to the array of green ceramic elements in other ways. For example, the reflective layer can be formed on the surfaces of the array of green ceramic elements by forcing dry powder into the gaps between elements under pressure, e.g. by spraying the powder as a dry aerosol. The dry powder inserted between the green ceramic elements can be the same material as the green ceramic elements, but may have either or both of a different particle size and pack density. According to one example, the green ceramic elements comprise an activated yttria-gadolinia material (e.g. a material comprising yttria, gadolinia, and at least one rare earth oxide activator such as europium as described above) having have a density which is about 55–65% of theoretical density and a mean particle diameter of about 0.5–0.7 microns, while the reflective powder comprises the same activated yttria-gadolinia material, but with a density which is about 25–35% of theoretical density and a mean particle diameter of about 0.2–0.3 microns.

The lower pack density of the reflector powder results in a reflector material which densities to a lesser degree and with lower shrinkage than the green ceramic elements during sintering. The lower degree of shrinkage of the reflector material provides the advantage that the array of ceramic elements maintain their shape and dimensional integrity during sintering to a larger extent than without the reflector material. The resulting porosity of the final reflector layer also acts to scatter the light entering the reflector layer back to the scintillator elements, thus preventing optical cross talk between elements.

Yet another method of applying the reflector layer between the green ceramic elements involves coating a refractory metal foil such as molybdenum or tungsten with the desired reflecting powder, inserting the coated foil into the gaps between the ceramic elements, and cosintering the composite article. The metal foil can be coated, for example, by dispersing the reflecting powder in a binder such as an acrylic emulsion to create a paint, and painting the powder onto the metal foil. The metal interface provides an additional light barrier which further reduces any cross talk between scintillator elements.

In cases where the array of green ceramic elements or the reflector composition includes one or more binders, a preheating step is typically carried out on the composite article to remove the binders from the array of green ceramic elements and/or the reflector composition. The preheating step typically involves a heating cycle in which the heating rate is about 3–100° C. per hour, the temperature ranges from 120–600° C., and the time ranges from 6–168 hours, more typically 6–48 hours, which effectively removes the organic binders from the array of green ceramic elements and/or the reflector composition without causing appreciable deformation. Alternately, the array of green ceramic elements can be preheated to burn off the binders before the incorporation of the reflective layer between the elements of the array. After the preheating step, the density of the green ceramic elements is typically about 55–70% of theoretical density. If desired, the steps of preheating the composite article, curing the reflector composition, and cosintering the composite article can be carried out in a single heating schedule, without intermittent cooling.

The composite article is then sintered at high temperatures in controlled environments for a desired amount of time to densify the ceramic to substantially its theoretical density so as to form a transparent material. For example, the sintering step can be conducted by heating the composite article in vacuum or in a reducing or oxidizing atmosphere at a rate of between approximately 100° C. per hour and 700° C. per hour to the sintering temperature of between about 1,800° C. and 2,100° C. This sintering temperature is held for about 1–30 hours, and then the composite article is cooled to room temperature over a period of time ranging from about 2–10 hours. Alternatively, the sintering sequence may include a hold step at a temperature lower than the final sintering temperature. For example, the composite article may be heated at a rate of between about 300 and 400° C. per hour to a holding temperature of between about 1,600° C. and 1,700° C. After a holding period ranging from about 1 hour to 20 hours, the temperature may be raised at a rate of between about 25° C. per hour and 75° C. per hour to a temperature between about 1,800° C. and 2,100° C., for final sintering for a period of between about 1 and 10 hours. Sintering refers to the process by which a ceramic material is densified toward its theoretical density by heating. The sintered scintillator material typically has a density which is greater than 99.9% of theoretical density.

After sintering, the filled reflector regions remain opaque, due to the specific composition of the powder, the lower density before sintering (typically 25–55% of theoretical density) and the resulting low density after sintering, which is typically 50–99.5%, more typically 70–80%, of theoretical density. The opaque reflective layer reflects the light emitted from the scintillator bars, thus preventing substantially all the light produced in one of the scintillator bars from propagating to a neighboring scintillator bar.

After the final cosintering process in which the green ceramic elements are densified to a transparent state with the reflective layer partially sintered to an opaque reflector, the connecting member 220, 420 of the array of ceramic elements can be removed by any conventional method. The rest of the array can then be finished to the required thickness, typically about 3 mm, and further processed to form the scintillator module.

Typically, a final reflector material of 100 micron (4 mil) thickness has a reflectance of greater than 98%, a transmittance of less than 3%, and an absorbance of less than 3% in the visible wavelengths, and radiation damage of less than 10%. Radiation damage is defined as the change in reflectivity in the visible wavelengths after 1 MRad of x-ray irradiation.

Yet another method of conforming the composite article comprising the array of green ceramic elements and the interspersed reflectors involves fabricating a sandwich of individual green ceramic elements with a layer of the reflector material in between. This can be accomplished by: 1) coating the green ceramic elements with a layer of reflector to the desired thickness, stacking the combination to form the desired array, and cosintering the composite structure; 2) forming a bed of the reflective powder of desired thickness on the green ceramic elements, forming a stack of the green ceramic elements to form an array, and cosintering the composite structure; 3) sandwiching a prefabricated layer of the reflective material in the form of a tape between the green ceramic elements to form the stack and cosintering the composite structure; or 4) aligning the plurality of green ceramic elements in a jig, immersing the plurality of ceramic elements in a slurry, drying the slurry, and cosintering the composite article.

EXAMPLE

An array of green ceramic elements as shown in FIG. 2 comprising an yttria-gadolinia material was cosintered with a reflector slurry having the following composition: 36 ml deionized water; 0.85 g Darvan 821A dispersant; 2.0 ml NH$_4$OH; and 50 g 99.99% pure phosphor grade Y$_2$O$_3$ from Moly Corporation. The slurry was paint shaked for 5 minutes. The array of green ceramic elements was then placed in a beaker. About half of the slurry was poured into the beaker, covering the array. The beaker was placed in a vacuum chamber, and a vacuum was maintained for 30 minutes. The beaker was then removed from the vacuum chamber, and the array was dried for about 1 hour. The array of green ceramic elements was then placed in a Brew furnace and sintered to near theoretical density.

The resulting article was a composite structure having scintillator bars and interspersed reflector layers. The dimensions of the composite structure were measured to ascertain the dimensional stability which was achieved according to this exemplary method. In particular, the widths of each of the scintillator bars ("r" in FIG. 2) and the widths of each of the reflector layers ("s" in FIG. 2) were measured at three points ("u", "v", "w" in FIG. 2) along the length of the bars. Data in microns are give below for the mean and standard deviation (σ) of the 16 bars and reflectors:

TABLE 1

| Position | "u" | | "v" | | "w" | |
| --- | --- | --- | --- | --- | --- | --- |
| Bar/reflect | bar | reflect. | bar | reflect. | bar | reflect. |
| Mean (μm) | 911.1 | 125.7 | 913.4 | 125.0 | 916.9 | 121.4 |
| σ (μm) | 4.06 | 13.7 | 8.13 | 16.5 | 6.86 | 9.40 |

The composite structure formed according to this embodiment of the invention was compared to a similar structure ("comparison structure") formed and sintered without an interspersed reflector material. Measurement of the dimensions of the comparison structure was difficult because polishing tends to cleave off pieces on the edges of the scintillator bars. However, a visual comparison showed that the dimensional stability achieved with the example of the invention described in Table 1 was clearly superior to the dimensional stability of the comparison structure.

Other embodiments of the invention will be apparent to those skilled in the art from a consideration of the embodiments disclosed herein. It is intended that the specification and examples be considered as exemplary only, with the scope and spirit of the invention being defined by the following claims.

What is claimed is:

1. A method of forming a ceramic scintillator article, the method comprising the steps of:

forming a plurality of green ceramic elements, wherein the green ceramic elements are arranged side by side, and the green ceramic elements are spaced from each other by gaps;

filling the gaps with a second material; and sintering the green ceramic elements with the second material to form the ceramic scintillator article;

wherein the second material, after being sintered, substantially remains between two sintered ceramic elements and prevents substantially all light in one of the sintered ceramic elements from reaching an adjacent sintered ceramic element.

2. The method of claim 1, wherein each of the plurality of green ceramic elements extend from a connecting member.

3. The method of claim 1, wherein the step of filling the gaps comprises:

forming a slurry containing the second material in powder form; and immersing the green ceramic elements in the slurry.

4. The method of claim 3, further comprising the step of exposing the green ceramic elements to a vacuum while the green ceramic elements are immersed in the slurry.

5. The method of claim 1, further comprising the step of aligning the plurality of green ceramic elements in a jig, and wherein the step of filling the gaps comprises immersing the plurality of ceramic elements in a slurry.

6. The method of claim 1, wherein the second material comprises a dry powder, and the step of filling the gaps comprises spraying the dry powder into the gaps.

7. A method of forming a composite article, the method comprising the steps of:

forming a plurality of green ceramic elements, wherein the green ceramic elements are arranged side by side, and the green ceramic elements are spaced from each other by gaps;

filling the gaps with a second material, wherein the step of filling the gaps comprises the steps of:
coating a metal foil with the second material; and
inserting the metal foil in the gaps; and sintering the green ceramic elements with the second material to form the composite article;

wherein the second material, after being sintered, substantially remains between two sintered ceramic elements and prevents substantially all light in one of the sintered ceramic elements from reaching an adjacent sintered ceramic elements.

8. The method of claim 1, wherein the step of forming a plurality of green ceramic elements comprises preparing a ceramic powder comprising gadolinium oxide and yttrium oxide.

9. The method of claim 1, wherein the step of forming a plurality of green ceramic elements comprises preparing a ceramic powder comprising an activated garnet material.

10. The method of claim 1, wherein the second material comprises at least one of yttrium oxide and gadolinium oxide.

11. The method of claim 1, wherein the first and second materials have the same chemical composition and different pack densities.

12. The method of claim 1, further comprising the step of preheating the composite article to remove at least one binder from at least one of the green ceramic elements and the second material.

13. The method of claim 3, further comprising the step of curing the slurry.

14. The method of claim 1, wherein the gaps comprise a plurality of parallel rectilinear gaps.

15. The method of claim 1, wherein the gaps comprise a first set of parallel rectangular gaps and a second set of parallel rectangular gaps, the first set of gaps being perpendicular to the second set of gaps.

16. A method of forming a ceramic scintillator structure comprising the steps of:

forming a plurality of green ceramic elements from a first powder comprising a first ceramic material, the first powder having a first pack density;

filling gaps between the green ceramic elements with a second powder comprising a second ceramic material, the second powder having a second pack density; and cosintering the green ceramic elements with the second powder to form the ceramic scintillator structure;

wherein the first ceramic material is the same as the second ceramic material, and the first pack density is different from the second pack density.

17. The method of claim 16, wherein the first and second ceramic materials comprise yttria and gadolinia.

18. The method of claim 17, wherein the first pack density is 55–65% of theoretical density, and the second pack density is 25–35% of theoretical density.

19. The method of claim 18, wherein the first powder has mean particle diameter of about 0.5–0.7 microns, and the second powder has a mean particle diameter of about 0.2–0.3 microns.

20. A method of forming a ceramic scintillator article, the method comprising the steps of:

forming a first component, the first component comprising a plurality of green ceramic elements extending from a connecting member, the plurality of green ceramic elements being connected only at the connecting member, wherein the gaps are defined between the green ceramic elements;

filling the gaps with a ceramic powder; and cosintering the green ceramic elements with the ceramic powder to form the ceramic scintillator article, wherein the ceramic powder, after being sintered, substantially remains between two sintered ceramic elements and prevents substantially all light in one of the sintered ceramic elements from reaching an adjacent sintered ceramic element.

21. The method of claim 20, wherein the step of filling the gaps comprises:

forming a slurry containing the second material; and immersing the green ceramic elements in the slurry.

22. The method of claim 21, further comprising the step of exposing the green ceramic elements to a vacuum while the green ceramic elements are immersed in the slurry.

23. The method of claim 20, wherein the step of filling the gaps comprises spraying the second material into the gaps.

24. A method of forming a composite article, the method comprising the steps of:

forming a first component, the first component comprising a plurality of green ceramic elements extending from a connecting member, the plurality of green ceramic elements being connected only at the connecting member, wherein the gaps are defined between the green ceramic elements;

filling the gaps with a ceramic powder, wherein the step of filling the gaps composes the steps of:
coating a metal foil with the ceramic powder; and
inserting the metal foil in the gaps; and cosintering the green ceramic elements with the ceramic powder to form the composite article, wherein the ceramic powder, after being sintered, substantially remains between two sintered ceramic elements and prevents substantially all light in one of the sintered ceramic elements from reaching an adjacent sintered ceramic element.

25. The method of claim 20, wherein the step of forming a plurality of green ceramic elements comprises preparing a ceramic powder comprising gadolinium oxide and yttrium oxide.

26. The method of claim 20, wherein the step of forming a plurality of green ceramic elements comprises preparing a ceramic powder comprising an activated garnet material.

27. The method of claim 24 wherein the ceramic powder has the same composition as the green ceramic elements.

28. The method of claim 24 wherein the ceramic powder has a different composition than the green ceramic elements.

* * * * *